United States Patent [19]

Donaldson

[11] Patent Number: 4,991,308
[45] Date of Patent: Feb. 12, 1991

[54] DIAMETER GAUGE

[75] Inventor: Charles W. Donaldson, Cincinnati, Ohio

[73] Assignee: General Electric Company, Cincinnati, Ohio

[21] Appl. No.: 367,587

[22] Filed: Jun. 19, 1989

Related U.S. Application Data

[63] Continuation-in-part of Ser. No. 156,507, Feb. 16, 1988, Pat. No. 4,928,392.

[51] Int. Cl.⁵ .................... G01B 7/12; G01B 11/08
[52] U.S. Cl. .................... 33/555.1; 33/555.3; 356/384; 356/386
[58] Field of Search ............ 33/555.1, 555.3, DIG. 3, 33/DIG. 21; 352/384, 385, 386, 387

[56] References Cited

U.S. PATENT DOCUMENTS

| | | | |
|---|---|---|---|
| 3,826,576 | 7/1974 | Stewart | 356/384 |
| 3,856,412 | 12/1974 | Zanoni | 356/167 |
| 4,007,992 | 2/1977 | Petrohilos et al. | 356/387 |
| 4,131,365 | 12/1978 | Pryor | 356/387 |
| 4,132,001 | 1/1979 | Petrik | 33/178 D |
| 4,141,149 | 2/1979 | George et al. | 33/178 D |
| 4,389,788 | 6/1983 | Balogh et al. | 33/178 D |

FOREIGN PATENT DOCUMENTS

| | | | |
|---|---|---|---|
| 605076 | 4/1978 | U.S.S.R. | 33/178 E |
| 1002831 | 3/1983 | U.S.S.R. | 356/384 |

Primary Examiner—William A. Cuchlinski, Jr.
Assistant Examiner—William C. Dowling
Attorney, Agent, or Firm—Jerome C. Squillaro; Charles L. Moore, Jr.

[57] ABSTRACT

A diameter gauge is disclosed for measuring the outside diameter of a part having a circular cross-section. The gauge comprises two arms converging to form a channel, a light source and a light detecting device. The part to be measured is placed within the channel, partially blocking or reflecting the transmission of light from the light source. The diameter of the part is determined from the location of the part shadow or reflected light.

8 Claims, 6 Drawing Sheets

DIAMETER GAUGE

This application is a continuation-in-part of application Ser. No. 07/156,507, filed Feb. 16, 1988, now U.S. Pat. No. 4,928,392.

BACKGROUND OF THE INVENTION

The present invention relates in general to diameter gauging apparatus and in particular to an apparatus and method for determining the outside diameter of an object or part having a circular cross section.

In machine shop practice, it is customary to use a micrometer to measure the outside diameter of a part having a circular cross section, e.g. a cylindrical shaft, as different steps of the machining process are completed. Difficulties may be encountered in accurately and reliably placing the micrometer in position on the part to be measured, itself a time-consuming procedure, and occasionally errors in measurement occur. Furthermore, a particular micrometer can generally only measure a given range of cross sectional sizes, so that a number of micrometers must be kept on hand for measuring parts of widely different diameters. Such a requirement not only increases the amount of capital tied up in equipment, but it also necessitates a certain amount of record keeping and equipment storage. Finally, the maintenance costs of the shop are increased since each micrometer must be periodically re-calibrated.

OBJECTS OF THE INVENTION

It is therefore a primary object of the present invention to provide a new and improved apparatus and method for measuring the outside diameter of a part having a circular cross section which are not subject to the foregoing disadvantages.

It is a further object of the present invention to provide an apparatus and method for quickly and accurately determining the outside diameter of cylindrical parts of widely different cross sections which require only a single measuring instrument.

It is another object of the present invention to provide an apparatus and method capable of making diameter measurements of cylindrical parts of widely different diameters which will result in a cost saving in capital equipment, as well as savings with respect to the maintenance of the required equipment, its storage and associated record keeping.

SUMMARY OF THE INVENTION

The principle underlying the present invention is implemented by a device comprising a pair of mutually facing, linear arms which converge to define a line of intersection. Such a device may be applied from any desired direction to the part to be measured. In a preferred embodiment, a light source is positioned along one side of the v-shaped channel formed by the linear arms. Opposite the light source, along the other side of the channel, a light detecting device is placed. The part to be measured is placed within the channel, partially blocking the transmission of light from the light source, across the channel, to the light detecting device. The diameter of the part is determined from the location of the lower edge of the part shadow cast upon the light detecting device.

These and other objects of the invention, together with the features and advantages thereof, will become apparent from the following detailed specification when read together with the accompanying drawings in which applicable reference numerals have been carried forward

DETAILED DESCRIPTION OF THE INVENTION

Figure 1:
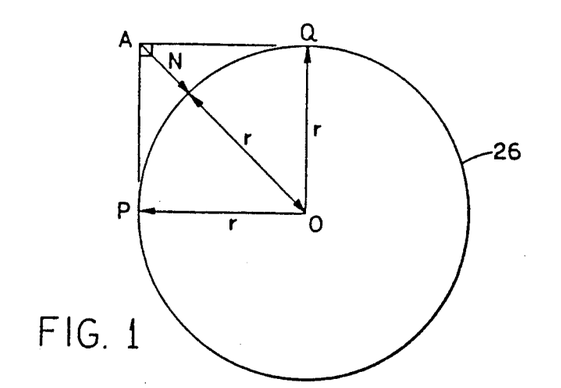
FIG. 1 illustrates the basic geometric principle underlying the invention.

With reference now to the drawings, FIG. 1 illustrates the geometric relationship underlying the present invention. Lines AP and AQ are tangents of circle 26 which is representative of a part having a circular cross section centered at point 0. Lines AP and AQ intersect at right angles to form vertex A. The distance between the vertex and one of the points of tangency P or Q, is seen to be equal to radius R. By measuring this distance, or a quantity representative of the distance, the outer diameter of the part represented by the circular cross section can be determined.

Figure 2:
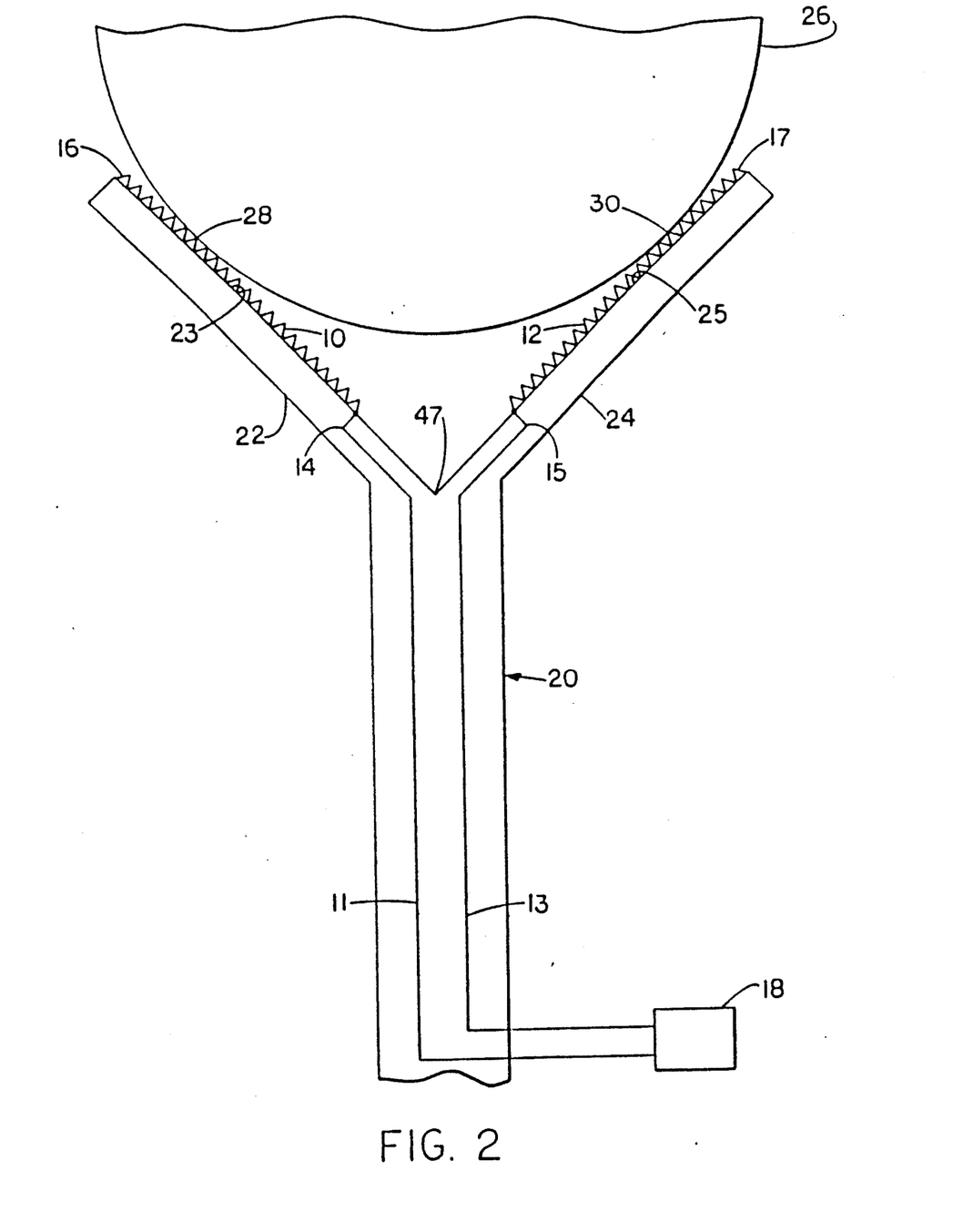
FIG. 2 is a partially schematic representation of one embodiment of the invention which makes use of a resistance measurement.

FIG. 2 is a partially schematic representation of one embodiment of the invention which makes use of the principle explained above by using a resistance measurement. A pair of arms 22 and 24 extend outward from a support structure 20 at right angles to one another. Arms 22 and 24 have a pair of mutually facing planar reference surfaces 23 and 25 respectively, which are equivalent to tangents AP and AQ in FIG. 1 with respect to part 26. For purposes of explanation, reference surfaces 23 and 25 are shown extended in phantom outline and define a line of intersection 47 equivalent to vertex A in FIG. 1.

Resistive means in the form of a pair of resistor elements 10 and 12, shown exaggerated in size for the sake of illustration, extend throughout the full length of surfaces 23 and 25 respectively The surface of each of these elements which faces part 26 is referred to as the contact surface and makes tangential contact with part 26. Although represented as a series of points in FIG. 2, it will be understood that the resistor material, e.g. resistive wire, may consist of closely wound turns and will in effect present a substantially continuous surface to part 26. Depending on the configuration of the contact surfaces (round or flat), and on the configuration of part 26 (sphere or cylinder), tangential contact will occur either at a point, such as points 28 and 30, or along a line. It should be noted that this tangential contact also establishes electrical contact between the resistor elements and part 26. For purposes of making a diameter measurement, only one of elements 10 and 12 needs to be a resistor. Where the other element is omitted, surface 25 functions as the second contact surface.

The resistor elements are of the type wherein resistance increases linearly with length, e.g. a wirewound resistance rod, a composition resistor, or a precision film resistor. Conductive composition resistors are preferred because of their characteristics of providing essentially infinite resolution. The resistance of each of elements 10 and 12 increases from a minimum, theoretically located at line 47, to a maximum at points 16 and 17. In practice, however, the points of minimum resistance are located at points 14 and 15 respectively, and these points are connected to an ohmmeter 18 by means of a pair of conductors 11 and 13 respectively.

With the arrangement shown, ohmmeter 18 measures the series combination comprising: the resistance of resistor element 10 up to tangency point 28, the resistance of that portion of part 26 between tangency points 28 and 30, resistor element 12 up to tangency point 30, and the negligible resistance of conductors 11 and 13. If part 26 has a larger diameter than shown in FIG. 2, tangency points 28 and 30 will move closer to points 16 and 17 respectively, if smaller they will be closer to points 14 and 15 respectively. Thus, the total resistance of the series combination will increase as a function of the part diameter.

Figure 3:
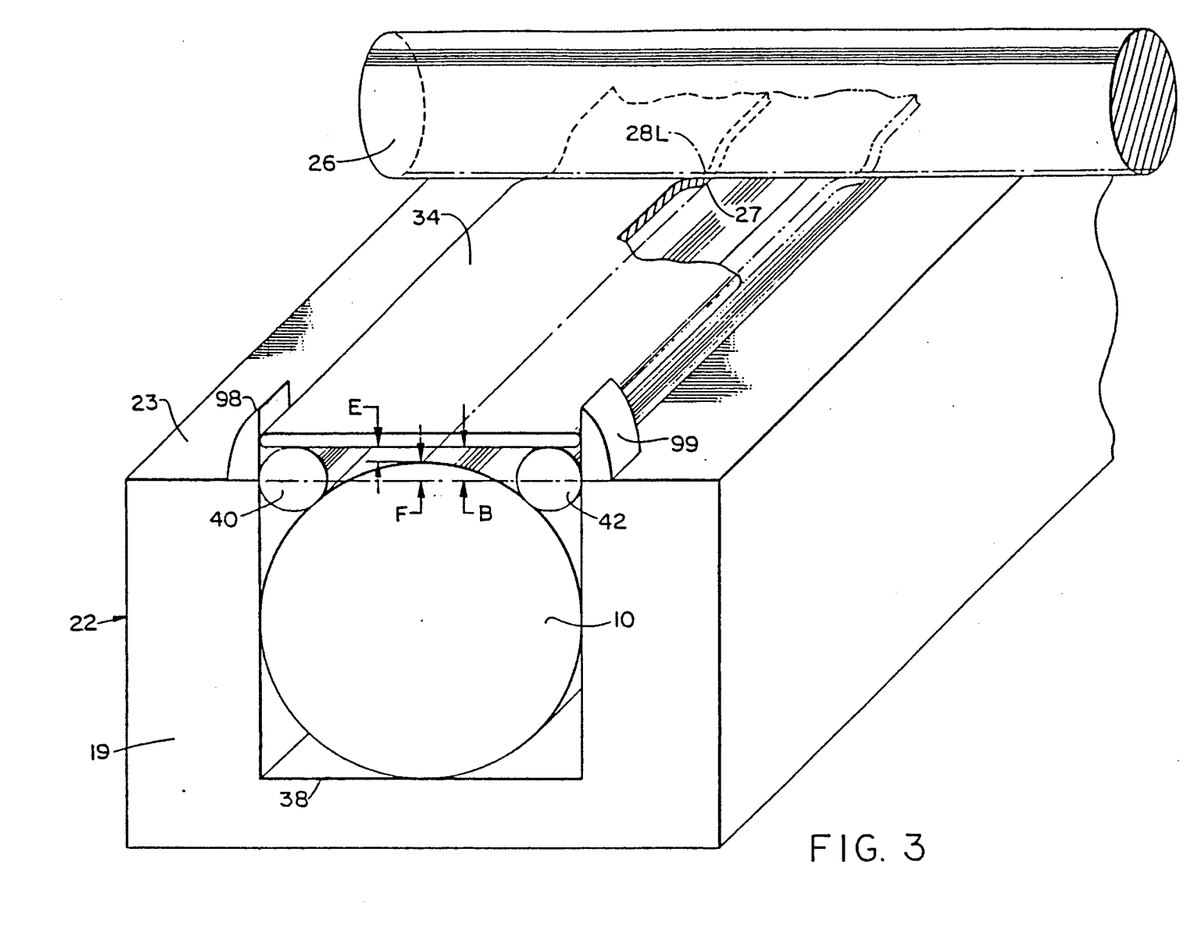
FIG. 3 illustrates in detail, a portion of one implementation of the apparatus of FIG. 2.

FIG. 3 illustrates in detail a portion of one implementation of the apparatus shown in FIG. 2, as viewed from the direction of end surface 16 of arm 22. In this embodiment of the invention, the measurement taken is independent of whether or not the measured part is electrically conductive. To implement this type of apparatus, the resistive means comprises resistor element 10 paired with a conductor element 34 of equal length. As shown, resistor element 10 constitutes a resistance rod of circular cross section, although it will be understood that rod 10 may also have a flat cross section. Unlike the arrangement of FIG. 2 where resistor element 10 is located on reference surface 23, in the present embodiment rod 10 is positioned in a groove 38 in surface 23 which runs the full length of arm 22 of the support structure. The depth of the groove is selected so that rod 10 protrudes above surface 23 of arm 22 by some minimum distance F. Two non-conductive, compressible spacers 40 and 42 flank resistor element 10 at opposite sides of groove 38. As shown, each spacer is coextensive in length with resistor element 10, lying partly within groove 38 but rising above reference surface 23 by a distance B greater than distance F. It will be understood that the spacers need not have the round cross section shown in FIG. 3 and that they may be disposed on reference surface 23 instead of in groove 38. Further, each spacer may consist of a series of successively spaced spacer sections rather than being continuous in length.

In operation, when part 26 is positioned between arms 22 and 24 for a diameter measurement, it makes contact with the flat conductive element 34 along a line of tangency 28L throughout the full width of element 34. As shown, spacers 40 and 42 are compressed. Further, depending on the construction of element 34, the latter may be flexed toward element 10 by the pressure of part 26 on it. Either as a result of spacer compression, or as consequence of spacer compression and the flexing of conductor element 34 toward element 10, conductor element 34 is moved through a distance E toward resistor element 10 and makes electrical contact with the latter.

In FIG. 3, conductor element 34 is shown broken away in part to expose point 27 where electrical contact between the conductor and resistor elements occurs. Since the line of tangency 28L and electrical contact point 27 are separated only by the thickness of conductor element 34, contact point 27 is substantially equivalent to tangency point P or Q in FIG. 1 and hence an accurate measurement is obtained. It will be clear that, instead of protruding above reference surface 23 by a distance F, conductor element 10 may also be positioned slightly below the plane of surface 23 to accommodate the thickness of the conductor element and to place the line of tangency 28L precisely in that plane during a diameter measurement.

As shown in FIG. 3 a pair of tabs 98 and 99 is mounted on reference surface 23, on opposite sides of groove 38. Another pair of tabs is mounted at the opposite end of arm 22, not shown in the drawing. The purpose of tabs 98 and 99 is to keep spacers 40 and 42 and flexible conductor 34 in place, i.e. in alignment with groove 38.

Figure 4:
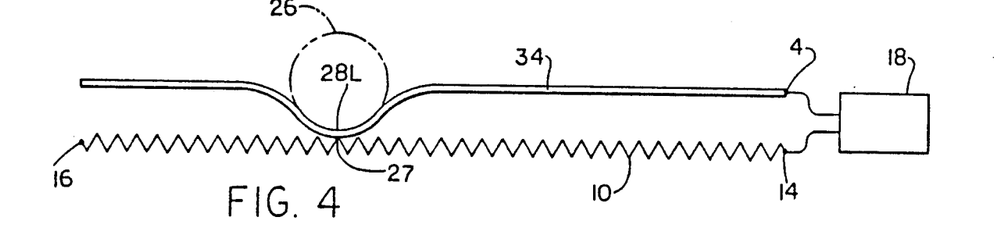
FIG. 4 represents schematically the pertinent electrical circuit portion of the apparatus shown in FIG. 3.

FIG. 4 is a schematic representation of the resistive means shown in FIG. 3 and of the series connection which results when part 26 is positioned for a diameter measurement. As in FIG. 3, the paired elements of the resistive means comprise resistor element 10, which extends between points 14 and 16 and conductor element 34. The line of tangency 28L between the contact surface of element 34 and part 26 is normal to the plane of the drawing. Electrical contact between elements 10 and 34 occurs at point 27 and establishes a series resistance loop consisting essentially of the resistance of element 10 between points 27 and 14 and the negligible resistance of conductor element 34. The position of line 28L, and hence of point 27, will depend on the diameter of the part under measurement. Ohmmeter 18, which is connected between terminals 4 and 14, is calibrated to directly provide the diameter of the part.

As previously explained, a single resistive means, consisting in the embodiment under discussion of a resistor element paired with a conductor element and placed on one arm of the structure shown in FIG. 2, is sufficient to provide the desired diameter measurement. Where both arms carry such resistive means, increased measurement accuracy will result if a measurement is taken with each and the results are averaged. Alternatively, the two series combinations can be connected as a single series loop so that a single ohmmeter reading will result from the input obtained from both arms.

Figure 5:
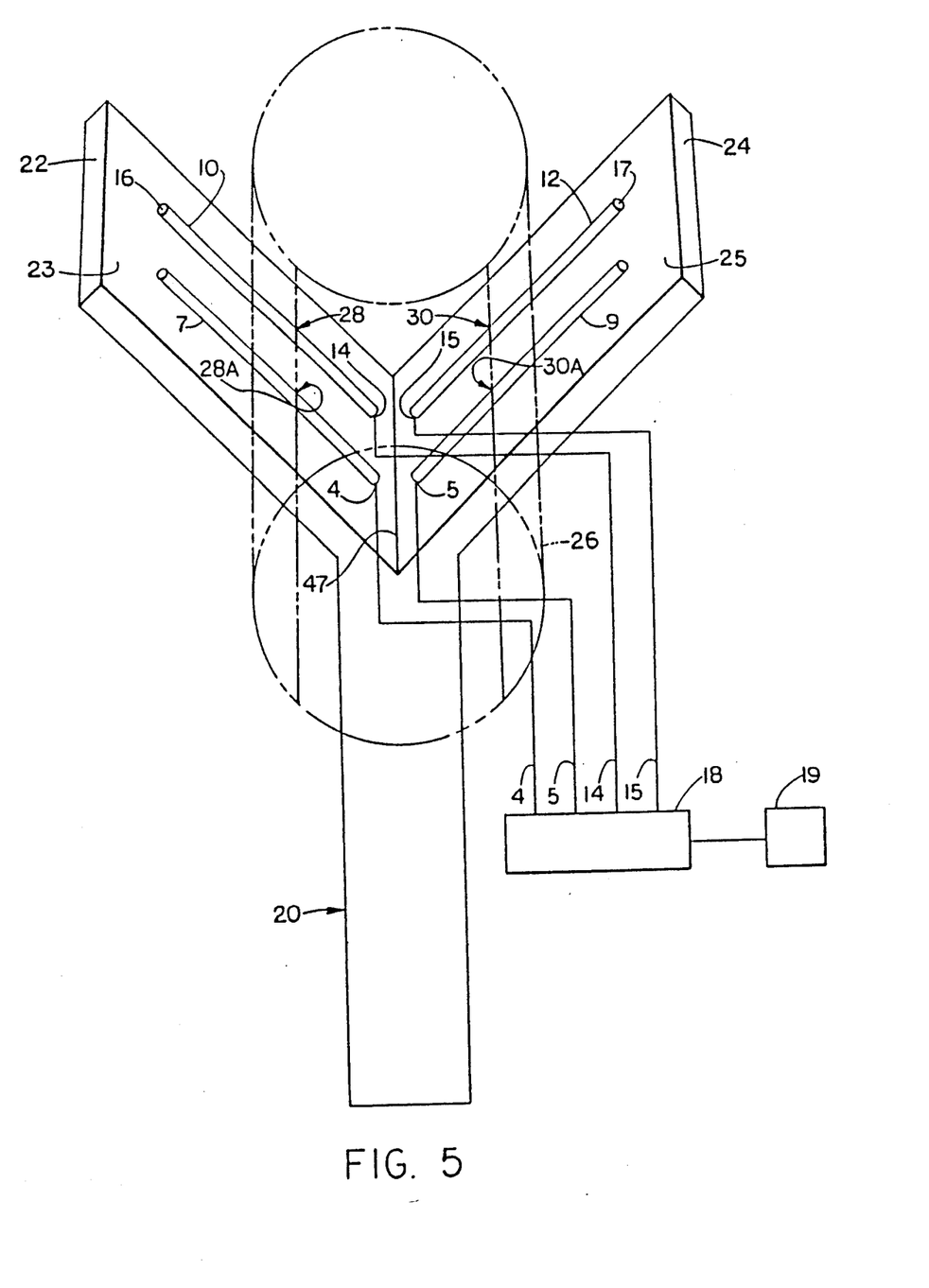
FIG. 5 illustrates an alternative implementation of the apparatus of FIG. 2

As previously explained, the apparatus of FIG. 3 is independent of the conductivity of part 26. FIG. 5 illustrates an implementation of the apparatus shown in FIG. 2 which similarly makes use of a resistance measurement, but which relies on the presence of an electrically conductive part. Resistor elements 10 and 12 are positioned respectively on mutually perpendicular reference surfaces 23 and 25 of arms 22 and 24, at right angles to the line of intersection 47. Resistor element 10 extends between terminals 14 and 16, while resistor element 12 extends between terminals 15 and 17.

Reference surfaces 23 and 25 further carry conductor elements 7 and 9 respectively, e.g. copper rods of negligible resistance. Elements 7 and 9 are positioned parallel to elements 10 and 12 respectively, in close proximity thereto but out of contact with the latter. They are the same length as elements 10 and 12 and they terminate in terminals 4 and 5 respectively Although elements 10, 12, 7 and 9 are shown cylindrical in FIG. 5, it will be understood that their configuration may be flat and that each may present a substantially planar contact surface to part 26, the latter being shown in phantom outline.

In operation, resistor elements 10 and 12 make electrical contact with part 26 at tangency points 28 and 30 respectively. These tangency points will vary along the length of the resistor elements, depending on the diameter of part 26. Ohmmeter 18 is connected between terminals 14 and 15 and measures a first series combination comprising the resistance of element 10 between points 28 and 14, the resistance of part 26 between point 28 and 30, and the resistance of element 12 between points 30 and 15. To determine the joint resistance of elements 10 and 12, the resistance of part 26 must be subtracted. This is done by means of conductive elements 7 and 9, which make electrical contact with part 26 at tangency points 28A and 30A, respectively. Thus, conductor elements 7 and 9 and the portions of part 26 between points 28A and 30A form a second series combination in which the resistance of the conductor element is negligible. Hence, the resistance of the second series combination, as measured by 35 ohmmeter 18 connected across terminals 4 and 5, is essentially the resistance of part 26 between points 28A and 30A. Because of the close proximity of points 28A and 30A to points 28 and 30 respectively, the latter resistance value is substantially identical to the resistance existing between points 28 and 30. It is subtracted by programmed device 19 from the measured resistance of the first series combination and converted into a measure of the diameter of part 26.

The above text describes, and FIGS. 2 and 5 illustrate, apparatus including perpendicular reference surfaces 23 and 25 and a pair of arms 22 and 24 which extend outward from a support structure 20 at right angles to one another. However, arms 22 and 24 and corresponding reference surfaces 23 and 25 need not be arranged at right angles to one another. The arms and reference surfaces may be arranged to form a channel having an included angle other than 90°. Resistance measurements would still vary directly with part diameter and ohmmeter 18 could easily be recalibrated to directly provide the diameter of the part.

Figure 6:
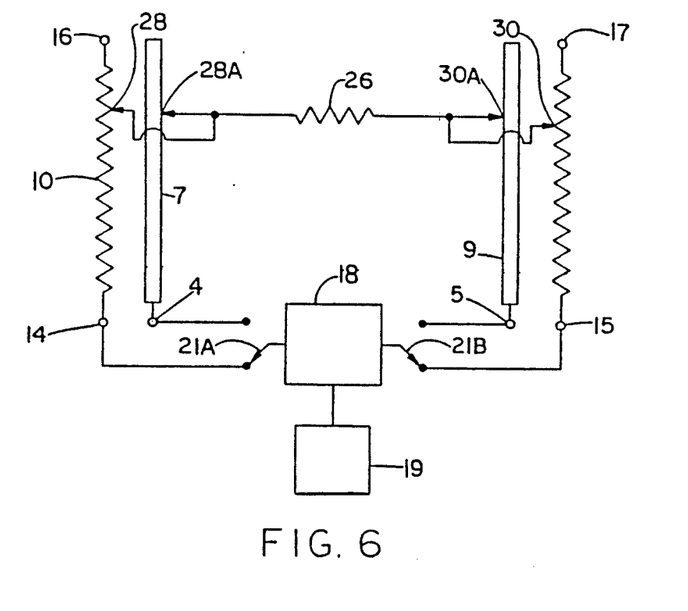
FIG. 6 is a schematic representation of the pertinent electrical circuit portion of the apparatus of FIG. 5.

FIG. 6 is a schematic presentation of the resistance measurement of the two series combinations described above. Arrows 28, 28A, 30, and 30A represent the variable position of the tangency points, as determined by the diameter of the part to be measured. Switches 21A and 21B are ganged and selectively connect ohmmeter 18 to the first or second series combination. The first series combination (shown connected to the ohmmeter), is seen to comprise the resistance of element 10 between points 14 and 28, the resistance of part 26 between points 28 and 30 and the resistance of element 12 between points 30 and 15. The second series combination comprises essentially the resistance of part 26 between points 28A and 30A.

Figure 7:
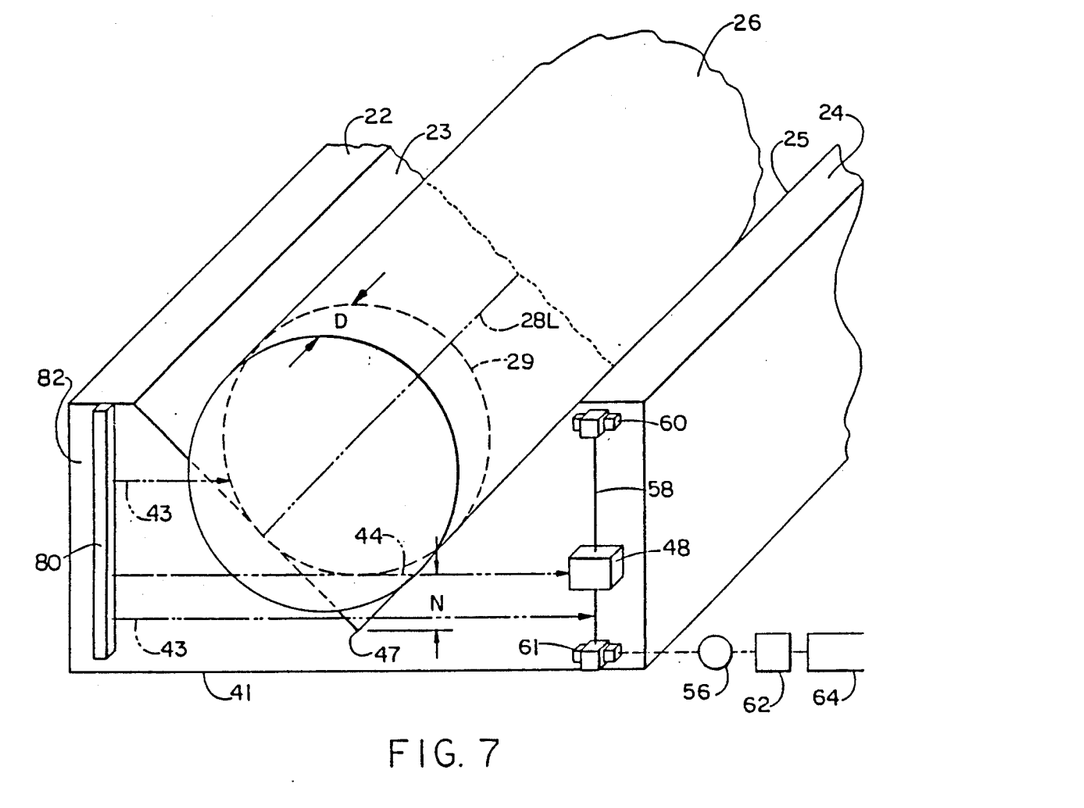
FIG. 7 illustrates one implementation of the preferred embodiment of the present invention which uses a light source.

Another embodiment in accordance with the principles of the present invention is shown in FIG. 7 and uses a source of light to determine the outer diameter of the cylindrical part. An elongate, distributed light source 80 extends along one side of a v-shaped common support structure 41 and provides a substantially uniform light output throughout its length. Structure 41 has a pair of mutually facing, planar reference surfaces 23 and 25 which also function as the contact surfaces in this embodiment of the invention. Surfaces 23 and 25 are located on arms 22 and 24, respectively and form a right dihedral angle having a line of intersection 47.

The contact surfaces are oriented to make contact with part 26 at a line of tangency on each surface when the part is positioned between arms 22 and 24 for a diameter measurement. Only one line of tangency is visible in FIG. 7 i.e. on contact surface 23 and it is labeled 28L.

The cross section of part 26 which is co-planar with the planar forward surface 82 of structure 41 is designated by the reference numeral 29. As shown in the drawing, the portion of part 26 whose diameter is to be measured protrudes beyond surface 82 by a distance D. Light source 80, which is positioned to one side of the dihedral angle, likewise protrudes beyond forward surface 82 and projects light in a plane parallel to the latter surface as indicated by arrows 43. Alternatively, the light source may be embedded in a slot in surface 23 so as project a plane of light at right angles to line 47.

A light sensing device 48 is positioned adjacent surface 82 on the other side of the dihedral angle. Detector 48 is shown affixed to a cable 58 and is capable of moving along a straight line path between pulleys 60 and 61, driven by a motor 56. An encoder 62 is coupled to motor 56 and is calibrated to determine the distance traveled by detector 48 along its path, i.e. the distance from one of the ends of the path. The encoder is capable of determining the diameter of part 26 from this information. A display 64 shows the output of encoder 62.

Figure 8:
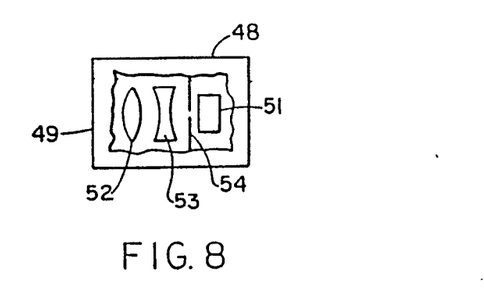
FIG. 8 illustrates details of the light sensing device used in the apparatus of FIG. 7.

Light sensing device 48 is illustrated in greater detail in FIG. 8. The light detector comprises a light receiving surface 49, a photodiode 51, and associated optics between the latter elements for focusing light. Specifically, the optics include a convex lens 52 for gathering light, a concave lens 53 for spreading light and a slit 54 for filtering light These optical elements assure that only light incident at 90° on light receiving surface 49 is capable of reaching photodiode 51.

In operation, the measuring device is applied to part 26, or the part is placed onto the device such that it rests in the dihedral angle formed by contact surfaces 23 and 25, as shown in FIG. 7. Part 26 is thus positioned between light source 80, and detector 48 and casts a shadow on the latter.

The lower edge of the shadow, i.e. the boundary between light and darkness, is labeled 44 in the drawing. Its location along the path traveled by detector 48 is determined by the diameter of part 26, specifically by the distance N of part 26 from the line of intersection 47.

Thus, light detector 48 passes from light to darkness, (or vice versa depending its direction of travel), at a point along its path which depends on the position of the edge 44 of the shadow cast by part 26. From a determination of this point on the path, herein referred to as the instantaneous path position, the diameter of part 26 is determinable.

Referring back to FIG. 1, lines AP and AQ, which are analogous to the right dihedral angle shown in FIG. 7, form a square with lines PO and QO. The circle has a radius r and the length of AO is $\sqrt{2}r$. From FIG. 1 it is apparent that the distance $N=(\sqrt{2}r)-r$ and that therefore $r=N/(\sqrt{2}-1)$. Since N is known through the position of detector 48, r and thus the diameter of part 26 can be determined.

Although reference surfaces 23 and 25 are shown in FIG. 7 as intersecting to form a right dihedral angle, the surfaces may be arranged to form a channel having an included angle other than 90°. Referring again to FIG. 1, the length of AO is r cosecant($\theta$), where $\theta$ is the angle between tangent lines AP and AQ. The distance N is equal to r csc($\theta$)−r. The length of r can therefor be determined from the equation r=N/[csc($\theta$)−1]. These equations can be used to determine the length of r for any angle $\theta$ between 0° and 180°. If $\theta$ is equal to 90°, as shown in FIG. 1, csc($\theta$) is equal to $\sqrt{2}$, and the equations for N and r reduce to those set out in the previous paragraph. If $\theta$ is equal to 60°, csc($\theta$) is equal to 2, and the relationship between N and r becomes N=r.

Figure 9:
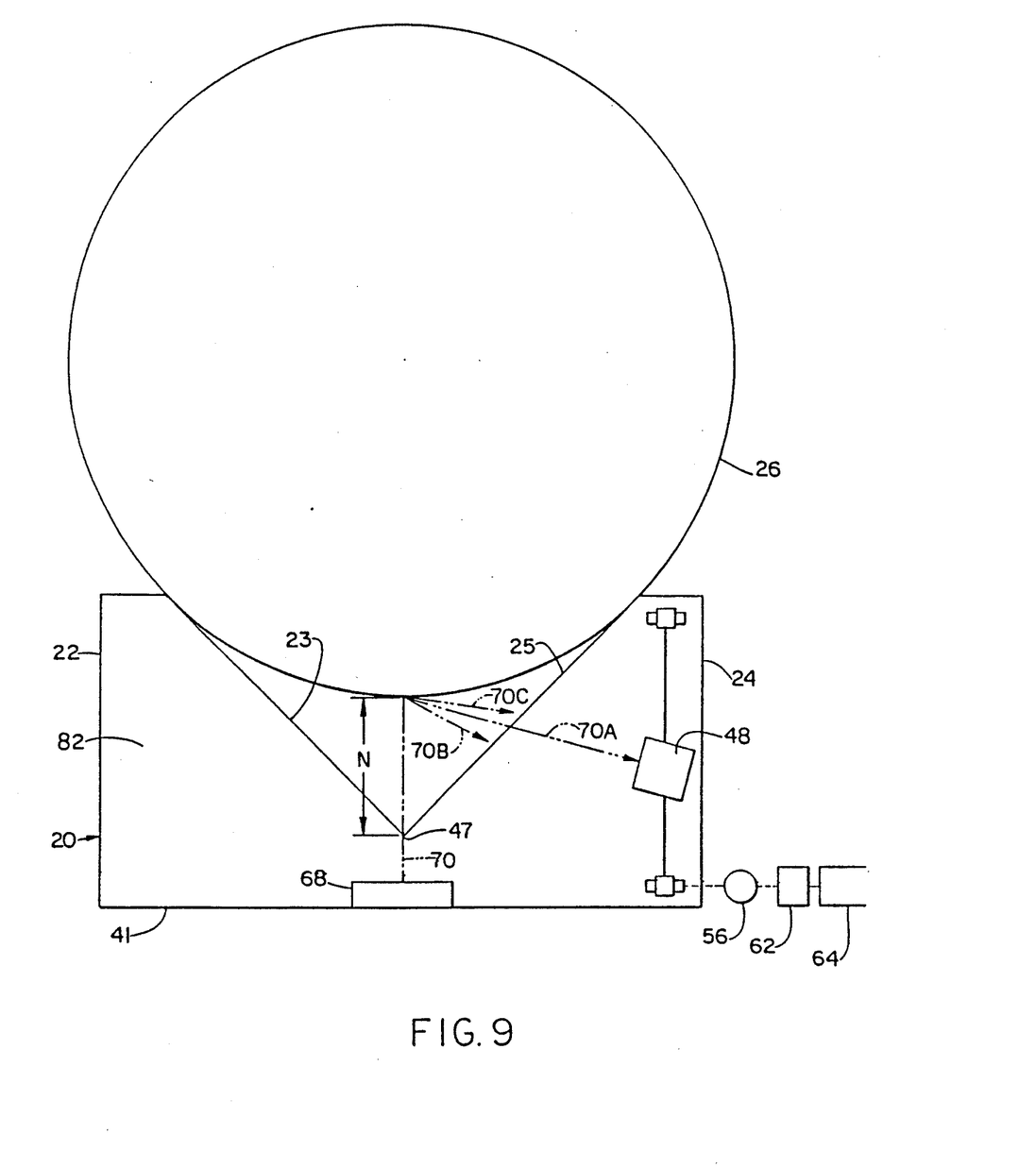
FIG. 9 illustrates a further implementation of the embodiment of the invention that makes use of a light source.

Another implementation of the embodiment of the invention which uses a light source is illustrated in FIG. 9. This version of the present invention includes substantially the same support structure 41 as in FIG. 7.

However, this implementation utilizes a triangulation system to determine the distance N between part 26 and line of intersection 47. This implementation requires a focussed light beam, e.g. a laser beam 70 provided by a laser source 68. Laser beam 70 is beamed onto part 26 in a direction perpendicular to the line of intersection 47 and it lies in the bisector plane of the dihedral angle, the latter plane being normal to the plane of the drawing. In practice, part 26 preferably protrudes beyond surface 82 toward the viewer. Similarly, the laser source is positioned forward of surface 82.

In the implementation of the invention shown in FIG. 9, part 26 has a dull exterior finish so as to provide diffuse reflections in response to the incident laser beam, as schematically indicated at 70A, 70B and 70C. The apparatus as shown in FIG. 9 also includes A light detector 48, substantially like the detector discussed in connection with FIG. 8, i.e. it will only sense light which is incident at 90° on its light receiving surface. Similarly, the mechanism for moving detector 48 along its path may be identical to that discussed in connection with FIG. 7. However, in the present embodiment detector 48 can also be tilted at an angle with respect to the horizontal so as to receive light reflections at a 90° angle of incidence. Thus, when reflected beam 70A is sensed, the instantaneous position of the detector along its path determines the diameter of part 26, as indicated by display 64.

The geometric relationship for determining the part diameter is the same as that underlying the embodiment illustrated in FIG. 7. However, instead of detecting the edge 44 of the shadow cast by part 26, the embodiment shown in FIG. 9 utilizes a triangulation system to detect the presence of a reflected beam incident at the prescribed angle on the light receiving surface of the light sensing means.

As previously stated, part 26 must have a dull finish so that it will reflect light in many directions. Although most of incident beam 70 is reflected back to light source 68, some of the reflections are scattered, as shown at 70A, 70B and 70C. However, because beam 70 is highly focussed, the reflections are sufficiently concentrated to be distinguishable from ordinary ambient light. The optical elements of detector 48, ensure that only reflections arriving at the proper angle will be detected by light detector 48.

It will be readily apparent to those skilled in the art that the present invention is not limited to the embodiments specifically illustrated and described above. As has already been stated, the light source in the apparatus shown in FIGS. 7 and 9 need not be positioned forward of surface 82. Similarly the mechanism for moving light detector 48 is illustrative only. For example, it will be readily understood that the detector may run in a conforming slide on surface 82, or that it may be moved by hand.

The support structure 20 is illustrated in different configurations for the various illustrated embodiments of the invention. It will be understood that these configurations are exemplary only and will depend on such practical considerations as convenience and the specific use intended. For example, as a hand-held gauge for measuring the diameter of a small part positioned on a machine tool, the invention will have a different configuration from apparatus which is stationary and to which parts are brought for measurement. Where the use of the invention as a hand-held diameter gauge is contemplated, it is intended that it be capable of being applied to the part from any desired angle and not only in the vertical position as shown in the drawings. Further, such a gauge must be self-contained and portable and hence the encoder and display, or the ohmmeter and the programmed device, are preferably incorporated into the support structure.

While the foregoing embodiments of the invention are intended to be illustrative only and are offered merely by way of example, it will be clear that numerous variations, adaptations, substitutions, changes and equivalents will now occur to those skilled in the art without departing from the spirit and scope of the invention as defined by the appended claims. Accordingly, the invention is intended to be limited only by the scope of the appended claims.

What is claimed is:

1. Apparatus for measuring the outside diameter of a part having a circular cross section, comprising:

first and second arms extending outward from a common support, said arms including a pair of mutually facing, planar contact surfaces converging to define a dihedral angle, each of said contact surfaces being oriented to make contact at a line of tangency with said part when said part is positioned between said arms for a diameter measurement;

means for projecting light in a predetermined direction, said light projection means extending along one of said first and second arms to provide a substantially uniform light output throughout the length of said one arm to cause said light to be at least partially blocked by said part when the latter is in position for said diameter measurement;

means for locating an edge of a shadow cast by said part; and means for determining the diameter of said part from the location of the edge of said shadow.

2. Apparatus according to claim 1, wherein said means for locating the edge of the shadow cast by said part includes:

light sensing means including a light receiving surface, said light sensing means including means for sensing only light incident at 90° on said light receiving surface;

means for moving said light sensing means along a predetermined path; and means for determining the instantaneous position of said light sensing means along said path at the point where predetermined light conditions are sensed.

3. Apparatus for measuring the outside diameter of a cylindrical part comprising:

first and second arms extending outward from a common support, said arms including a pair of mutually facing, planar contact surfaces converging at a dihedral angle, each of said contact surfaces being oriented to make contact at a line of tangency with said part when said part is positioned between said arms for a diameter measurement;

a light source positioned to one side of said dihedral angle for projecting light substantially in a plane normal to the axis of said part when said part is in position for a diameter measurement, said light source being partially blocked by said positioned part to cause the latter to cast a shadow in said plane;

light sensing means positioned in said plane on the other side of said dihedral angle, said light sensing means including a light receiving surface, and means for sensing only light incident at 90° on said light receiving surface;

means for moving said light sensing means along a path in said plane substantially parallel to the bisector of said dihedral angle;

means for determining the instantaneous position of said light sensing means along said path at the point where the boundary between light from said source and said shadow is sensed; and means responsive to said instantaneous path position for determining said part diameter.

4. Apparatus for measuring the outside diameter of a part having a circular cross section, comprising:

first and second arms extending outward from a common support, said arms including a pair of mutually facing, planar contact surfaces converging to define a right dihedral angle, each of said contact surfaces being oriented to make contact at a line of tangency with said part when said part is positioned between said arms for a diameter measurement;

means for projecting light in a predetermined direction selected such that said light is at least partially blocked by said part when the latter is in position for said diameter measurement;

light sensing means including a light receiving surface, said light sensing means including means for sensing only light incident at 90° on said light receiving surface;

means for moving said light sensing means along a predetermined path;

means for determining the instantaneous position of said light sensing means along said path at the point where predetermined light conditions are sensed; and means responsive to said instantaneous path position for determining said part diameter.

5. Apparatus for measuring the outside diameter of a cylindrical part comprising:

first and second arms extending outward from a common support, said arms including a pair of mutually facing, planar contact surfaces converging at a right dihedral angle, each of said contact surfaces being oriented to make contact at a line of tangency with said part when said part is positioned between said arms for a diameter measurement;

a light source positioned to one side of said dihedral angle for projecting light substantially in a plane normal to the axis of said part when said part is in position for a diameter measurement, said light source being partially blocked by said positioned part to cause the latter to cast a shadow in said plane;

light sensing means positioned in said plane on the other side of said dihedral angle, said light sensing means including a light receiving surface, and means for sensing only light incident at 90° on said light receiving surface;

means for moving said light sensing means along a path in said plane substantially parallel to the bisector of said dihedral angle;

means for determining the instantaneous position of said light sensing means along said path at the point where the boundary between light from said source and said shadow is sensed; and means responsive to said instantaneous path position for determining said part diameter 6. Apparatus for measuring the outside diameter of a cylindrical part having a dull reflective finish; said apparatus comprising:

first and second arms extending outward from a common support, said arms including a pair of mutually facing, planar contact surfaces converging at a dihedral angle to define a line of intersection; each of said surfaces being oriented to make contact at a line of tangency with said part when said part is positioned between said arms for a diameter measurement;

triangulation means for determining the distance between said line of intersection and said part, said distance being measured in the bisector plane of said dihedral angle and in a direction perpendicular to said line of intersection; and means for determining part diameter from the distance between said line of intersection and said part.

7. Apparatus according to claim 6, wherein said triangulation means includes:

means for projecting a focussed beam at said cylindrical part in the bisector plane of said dihedral angle and in a direction perpendicular to said line of intersection;

means positioned to one side of said dihedral angle for sensing diffuse light reflections produced by the incidence of said beam on said dull reflective finish, said light sensing means including a light receiving surface, and means for sensing only light reflections which are incident at 90° on said light receiving surface;

means for moving said light sensing means along a path parallel to said beam; and means for determining the instantaneous position of said light sensing means along said path at the point where said light reflections are incident at 90° on said receiving surface.

8. Apparatus for measuring the outside diameter of a cylindrical part having a dull reflective finish; said apparatus comprising:

first and second arms extending outward from a common support, said arms including a pair of mutually facing, planar contact surfaces converging at a right dihedral angle to define a line of intersection; each of said surfaces being oriented to make contact at a line of tangency with said part when said part is positioned between said arms for a diameter measurement;

means for projecting a focussed beam at said cylindrical part in the bisector plane of said dihedral angle and in a direction perpendicular to said line of intersection;

means positioned to one side of said dihedral angle for sensing diffuse light reflections produced by the incidence of said beam on said dull reflective finish, said light sensing means including a light receiving surface, and means for sensing only light reflections which are incident at 90° on said light receiving surface;

means for moving said light sensing means along a path parallel to said beam;

means for determining the instantaneous position of said light sensing means along said path at the point where said light reflections are incident at 90° on said receiving surface; and means responsive to said instantaneous path position for determining said part diameter.

* * * * *